United States Patent
Loens

(10) Patent No.: US 10,316,914 B2
(45) Date of Patent: Jun. 11, 2019

(54) SELECTIVELY SELF-LOCKING ELECTROMECHANICALLY AND HYDRAULICALLY ACTUATED MOTOR VEHICLE BRAKE

(71) Applicant: Lucas Automotive GmbH, Koblenz (DE)

(72) Inventor: Michael Loens, Lahnstein (DE)

(73) Assignee: Lucas Automotive GmbH, Koblenz (DE)

( * ) Notice: Subject to any disclaimer, the term of this patent is extended or adjusted under 35 U.S.C. 154(b) by 71 days.

(21) Appl. No.: 15/105,121

(22) PCT Filed: Dec. 15, 2014

(86) PCT No.: PCT/EP2014/077749
§ 371 (c)(1),
(2) Date: Jun. 16, 2016

(87) PCT Pub. No.: WO2015/097010
PCT Pub. Date: Jul. 2, 2015

(65) Prior Publication Data
US 2016/0377138 A1  Dec. 29, 2016

(30) Foreign Application Priority Data

Dec. 23, 2013 (DE) .......................... 10 2013 022 058

(51) Int. Cl.
*F16D 65/18* (2006.01)
*B60T 13/58* (2006.01)
(Continued)

(52) U.S. Cl.
CPC ............ *F16D 65/18* (2013.01); *B60T 13/588* (2013.01); *B60T 13/741* (2013.01);
(Continued)

(58) Field of Classification Search
CPC .... F16D 2127/06; F16D 65/18; F16D 55/226; F16D 2121/24; F16D 2125/48; F16D 2125/50
See application file for complete search history.

(56) References Cited

U.S. PATENT DOCUMENTS 5,829,845 A   11/1998  Maron et al.
6,012,556 A    1/2000  Blosch et al.
(Continued)

FOREIGN PATENT DOCUMENTS

DE   19601983 C1   7/1997
DE   19654729 A1   7/1999
(Continued)

OTHER PUBLICATIONS

PCT International Search Report and Written Opinion, Application No. PCT/EP2014/077749 filed Dec. 15, 2014, dated Aug. 11, 2015.
(Continued)

*Primary Examiner* — Xuan Lan Nguyen
(74) *Attorney, Agent, or Firm* — MacMillan, Sobanski & Todd, LLC

(57) ABSTRACT

A motor vehicle brake, in particular a combined hydraulically and electromechanically actuated motor vehicle brake, comprising an actuator subassembly that includes: a brake housing, an actuation member, which is movable in relation to the brake housing, for hydraulically or electromechanically moving a brake lining, a motor-operated drive, a moving mechanism between the motor-operated drive and the movable actuation member, a gear train associated with the moving mechanism, and a separate self-locking device which is designed to block the moving mechanism as needed. The gear train includes at least two gear stages. The disclosed motor vehicle brake is characterized in that the self-locking device is arranged on the gear train in such a way that reactive forces of the self-locking device that occur during the self-locking action can be deflected into the brake housing via a force guiding member.

12 Claims, 9 Drawing Sheets

(51) Int. Cl.
*B60T 13/74* (2006.01)
*F16D 55/226* (2006.01)
*F16D 121/24* (2012.01)
*F16D 127/06* (2012.01)
*F16D 125/48* (2012.01)
*F16D 125/50* (2012.01)

(52) U.S. Cl.
CPC ........ *F16D 55/226* (2013.01); *F16D 2121/24* (2013.01); *F16D 2125/48* (2013.01); *F16D 2125/50* (2013.01); *F16D 2127/06* (2013.01)

(56) References Cited

U.S. PATENT DOCUMENTS

| 8,051,957 | B2 | 11/2011 | Giering et al. |
| 8,118,149 | B2 | 2/2012 | Cao et al. |
| 8,616,348 | B2 | 12/2013 | Winkler et al. |
| 9,340,194 | B2 | 5/2016 | Giering |
| 2005/0109567 | A1 | 5/2005 | Baumann et al. |
| 2014/0069751 | A1 | 3/2014 | Park et al. |

FOREIGN PATENT DOCUMENTS

| DE | 10349078 A1 | 5/2005 |
| DE | 102006000746 A1 | 7/2007 |
| DE | 102008054399 A1 | 6/2010 |
| DE | 102011085367 A1 | 5/2012 |
| DE | 102012208294 A1 | 11/2012 |
| DE | 102011102860 A1 | 12/2012 |
| WO | 2008/037738 A1 | 4/2008 |
| WO | 2009/046899 A1 | 4/2009 |

OTHER PUBLICATIONS

PCT International Preliminary Report on Patentability, Application No. PCT/EP2014/077749 filed Dec. 15, 2014, dated Mar. 29, 2015.

SELECTIVELY SELF-LOCKING ELECTROMECHANICALLY AND HYDRAULICALLY ACTUATED MOTOR VEHICLE BRAKE

CROSS-REFERENCE TO RELATED APPLICATIONS

This application is a national stage of International Application No. PCT/EP2014/077749 filed 15 Dec. 2014, the disclosures of which are incorporated herein by reference in entirety, and which claimed priority to German Patent Application No. 10 2013 022 058.0 filed 23 Dec. 2013, the disclosures of which are incorporated herein by reference in entirety.

BACKGROUND OF THE INVENTION

The invention relates to an electromechanically and hydraulically operable motor vehicle brake having an actuator assembly, comprising: a brake housing, an actuation member which is movable in relation to the brake housing for hydraulically or electromechanically moving a brake lining, a motor drive, a displacement mechanism arranged between the motor drive and the movable actuation member, a gear train assigned to the displacement mechanism, and a separate self-locking device, which is designed to block the displacement mechanism as needed, wherein the gear train has at least two gear stages.

For a long time, motor vehicle brakes have been in use, in which the brake linings are hydraulically displaced in the usual manner in the case of normal operational braking while driving the vehicle, but in which for activation of a parking brake function, an electromechanical displacement of the brake linings or at least an electro-mechanically triggered locking of the brake linings in a braking position takes place. Such motor vehicle brakes offer the advantage that the parking brake function can be activated or released more conveniently by simple operation of an activation switch.

Such electromechanically and hydraulically operable motor vehicle brakes are known from the state of the art. WO 2008/037738 A1 thus describes a motor vehicle brake that can be operated both hydraulically and electromechanically. In a normal operational situation, i.e., while driving the vehicle, this motor vehicle brake is operated hydraulically in the usual way. However, the electromechanical operating function is activated for activation of a parking brake. This triggers an electric motor, driving a spindle-nut arrangement via a displacement mechanism with a gear train. The gear train is designed to be self-locking with a worm gear to prevent the parking brake effect from being diminished when the parking brake is activated. However, the self-locking effect has the disadvantage that only very low degrees of efficiency can be achieved, so that the components, in particular the electric motor, must be designed to be relatively powerful and must have a high power consumption. It is true that the total efficiency of the system is comprised of the product of the individual efficiencies of the components. For example, efficiency is derived from the product of the efficiency of the motor, the efficiency of the downstream gear train and the spindle-nut arrangement. Thus, an efficiency in the range of only 30% or less can be achieved with a gear train having a self-locking effect.

DE 10 2012 208 294 A1 describes a motor vehicle brake, in which a separate self-locking device is arranged directly on the nut-spindle assembly. Reference is made particular to FIG. 8 in this document, where it is shown that the self-locking device, which is designated as coupling device 41, is arranged between the rolling body ramp gear and the brake piston. Such a direct spatial correlation of the self-locking device with the spindle-nut assembly and a ball screw drive has the disadvantage that the reactive forces occurring in activation of the brake and maintenance of a (parking) brake state must be absorbed by the self-locking device to the full extent. The self-locking device must be designed to be solid accordingly, as a result of which it takes up a substantial amount of space. Therefore, the brake must also be designed to be disproportionately large in the axial direction, in particular with respect to the threaded spindle.

Furthermore, DE 10 2011 102 860 A1 discloses a motor vehicle brake that has been improved in comparison with this prior art, in which the self-locking device is arranged close to the spindle-nut arrangement but is integrated into the gear train, so that the installation space can be reduced in the axial direction with respect to the threaded spindle. This brake can be designed to be more compact.

There is basically also a problem in diverting the reactive forces occurring in the self-locking device. One thing to be taken into account here is that as many housing components as possible should be manufactured from a lightweight material such as aluminum, for example, in order to reduce their weight. However, this has the disadvantage that it is very difficult to divert high reactive forces such as those possibly occurring with self-locking devices of the type described above and they may be subject to high wear.

Further prior art is to be found in the documents DE 103 49 078 A1, DE 10 2008 054399 A1, KR 101 331 783 B1 and U.S. Pat. No. 5,829,845 A.

BRIEF SUMMARY OF THE INVENTION

A feature of the present invention is to provide a vehicle brake, which can be used both as an operating brake and as a parking brake, and which has been further optimized with regard to the diversion of the reactive forces occurring in the self-locking device in comparison with the state of the art.

This feature is achieved by a vehicle brake of the type defined in the introduction in which it is provided that the self-locking device is arranged in or on the gear train in such a way that reactive forces of the self-locking device, which occur in the context of self-locking, can be diverted reliably, with little effort and without wear.

The advantage of the present invention is that the at least two gear stages with their reduction gearing can be utilized at least partially to reduce the reactive forces originating from the tension forces on the brake linings, so that the self-locking device can be designed with smaller dimensions. In addition, the invention provides a force conducting element, which is designed specifically for diversion of the reactive forces and is also designed with regard to its stability and structure, so that it absorbs the reactive forces originating from the self-locking device and diverts them directly into the rigid and stable brake housing of the vehicle brake.

The invention provides for the force conducting element to be designed as a receptacle body, in which the self-locking device is accommodated at least partially, wherein the receptacle body is coupled to the brake housing in a force-transmitting manner. A space-saving arrangement can be achieved in this way.

In this context, the invention provides that the receptacle body is designed as a hollow body and has at least one mounting flange, by means of which it is coupled to the brake housing in a force-transmitting manner. The hollow body can be mounted reliably on the brake housing by means of the mounting flange. In particular it is possible to thereby provide that the receptacle body is manufactured as a deep-drawn part from a steel material. This permits simple manufacturing with a stable structure at the same time for deriving the reactive forces.

For simplified mounting of the force conducting element on the brake housing, a refinement of the invention provides that the receptacle body has at least two lateral mounting brackets having mounting boreholes.

According to one embodiment variant of the invention, it is possible to provide that the displacement mechanism has a ball screw drive with a spindle and a nut, wherein the one component can optionally be driven to rotation by the spindle and nut, while the other component can be displaced linearly by the spindle and nut for displacement of the actuation member by the rotational drives of one component within the brake housing. In this context, it is also possible in one embodiment variant of the invention for the gear train to have three or four gear stages, wherein the self-locking device is arranged close to the movable actuation member inside the gear train.

The different gear stages may be designed as needed. In a preferred variant of the invention, it is provided that the first gear stage and the second gear stage are each designed as a star wheel gear having a gear reduction ratio from the range between 4.4:1 and 6.6;1, preferably approximately 5.4:1. If a third gear stage is provided, then in this embodiment variant, it is also possible to provide for the third gear stage to be designed as a planetary gear with a gear reduction ratio from the range between 6.4:1 and 8.6:1, preferably approximately 7.125:1, wherein the force conducting element is preferably designed as a hollow wheel.

In a preferred embodiment of the invention, it is provided that the actuator has a total reduction ratio from the range between 115:1 and 400:1, preferably approximately 208:1. Such a design of the total reduction ratio has proven to be particularly advantageous with regard to the transfer of force and the dimensioning.

With regard to the arrangement of the self-locking device, according to a refinement of the invention the self-locking device is connected upstream from the gear stage of the gear train closest to the movable actuation member. This arrangement of the self-locking device with the force conducting element according to the invention has the advantage that the reactive forces occurring when blocking the displacement mechanism can be diverted directly into the housing with little effort by means of the force conducting element.

In a preferred embodiment variant of the invention, it is provided that the self-locking device is designed with a wrap spring clutch, which allows a transfer of torque from the motor drive to the spindle and is designed for blocking the transfer torque from the spindle to the motor drive. With such a wrap spring clutch it is possible to prevent a great loss of efficiency because the wrap spring clutch permits largely direct transfer of force with almost no loss in its released state, while reliably blocking the transfer of force in the engaged state. In this context, a switch element is assigned to the wrap spring clutch, allowing a transfer of torque from the spindle to the motor drive in a first switch position and, on reaching a second switch position, prompts the wrap spring clutch to block the transfer of torque from the spindle to the motor drive. Such a switch element may be a meandering spring, for example.

In this context, it may also be provided that, as a wrap spring, the wrap spring clutch has a helical spring, which is wound with at least one winding around a target face has two ends, which can be coupled in a torque-transmitting manner to a first gear wheel at one end and to a second gear wheel at the second end, so that the torque can be transferred. At least one winding is in contact with a surface of the target face. In this embodiment variant of the invention, it is preferably provides that each of the gear wheels has one claw, which can be brought into torque-transmitting engagement with the end of the helical spring assigned to the respective gear wheel. The claws serve to couple the respective gear wheel to the helical spring arranged between the claws in a manner sufficient for transfer of force and torque. The helical spring is the force-transmitting element, which allows a transfer of force from the motor drive to the spindle and blocks it in the opposite direction. According to one embodiment variant of the invention, this is achieved in particular by the fact that, in a transfer of torque from the motor drive to the spindle, the helical spring becomes somewhat wider radially with respect to the target face, so that it slides reliably on the target face in the transfer of torque and the helical spring contracts radially with respect to the target face in the case of a transfer for torque from the spindle to the motor drive so that it acts radially on the target face so that it blocks the transfer of torque. When blocked, the helical spring contracts around the target face, and thereby ensures high frictional forces as a result of this wrap, ultimately preventing any further movement and therefore stopping any transfer of torque via the helical spring. In this state, it blocks the gear.

In one embodiment variant, if the vehicle brake is used both as an operating brake and as a parking brake, then it may be necessary for the function as an operating brake to allow a transfer torque from the spindle to the motor drive in a certain context. As part of the parking brake function, such a transfer of torque must be suppressed however for the reasons given above. This means that for the function as an operating brake and for the function as a parking brake, opposite requirements are in effect so to speak. In one embodiment variant, the present invention achieves a differentiation between the operating brake function and the parking brake function by making use of the fact that significantly higher torques and/or tension forces are generally used for activation of the parking brake than is the case with the operating brake function. Depending on the size and/or amount, the tension forces that are applied can thus be "switched" between the operating brake function and the parking brake function. In terms of the design, this switching is achieved by the fact that, in this embodiment variant, one switch element is assigned is assigned to the wrap spring clutch. In a first switch position, this switch element allows a transfer of torque from the spindle to the motor drive, and on reaching a second shift position, it prompts the wrap spring clutch to block any transfer of torque from the spindle to the motor drive. This switch element performs the switching as a function of the tension force acting on it. According to the invention, it is possible for the switch element to include at least one elastic deformation element. The at least one deformation element allows a transfer of force in both directions between the motor drive and the spindle as part of a certain degree of deformation. Beyond a certain tension force induced deformation, the at least one deformation element reaches the second switch position in which a transfer of force from the motor drive to the spindle is then possible again but is blocked in the opposite direction. It is possible in particular to provide here that the switch element assumes its first or second switch position in accordance with a tension force acting on the wrap spring between the first gear wheel and the second gear wheel.

According to a preferred embodiment variant of the invention, the gear train has a planetary gear mechanism. Furthermore in this context it may be provided according to the invention that the output shaft has a drive coupling to a sun wheel of the planetary gear mechanism, wherein a hollow wheel of the planetary gear mechanism is arranged in a permanent mount on the housing, and wherein planetary wheels of the planetary gear mechanism are rotationally mounted on a planetary carrier which is itself mounted so it can rotate in the housing.

Other advantages of this invention will become apparent to those skilled in the art from the following detailed description of the preferred embodiments, when read in light of the accompanying drawings.

DETAILED DESCRIPTION OF THE INVENTION

Figure 1:
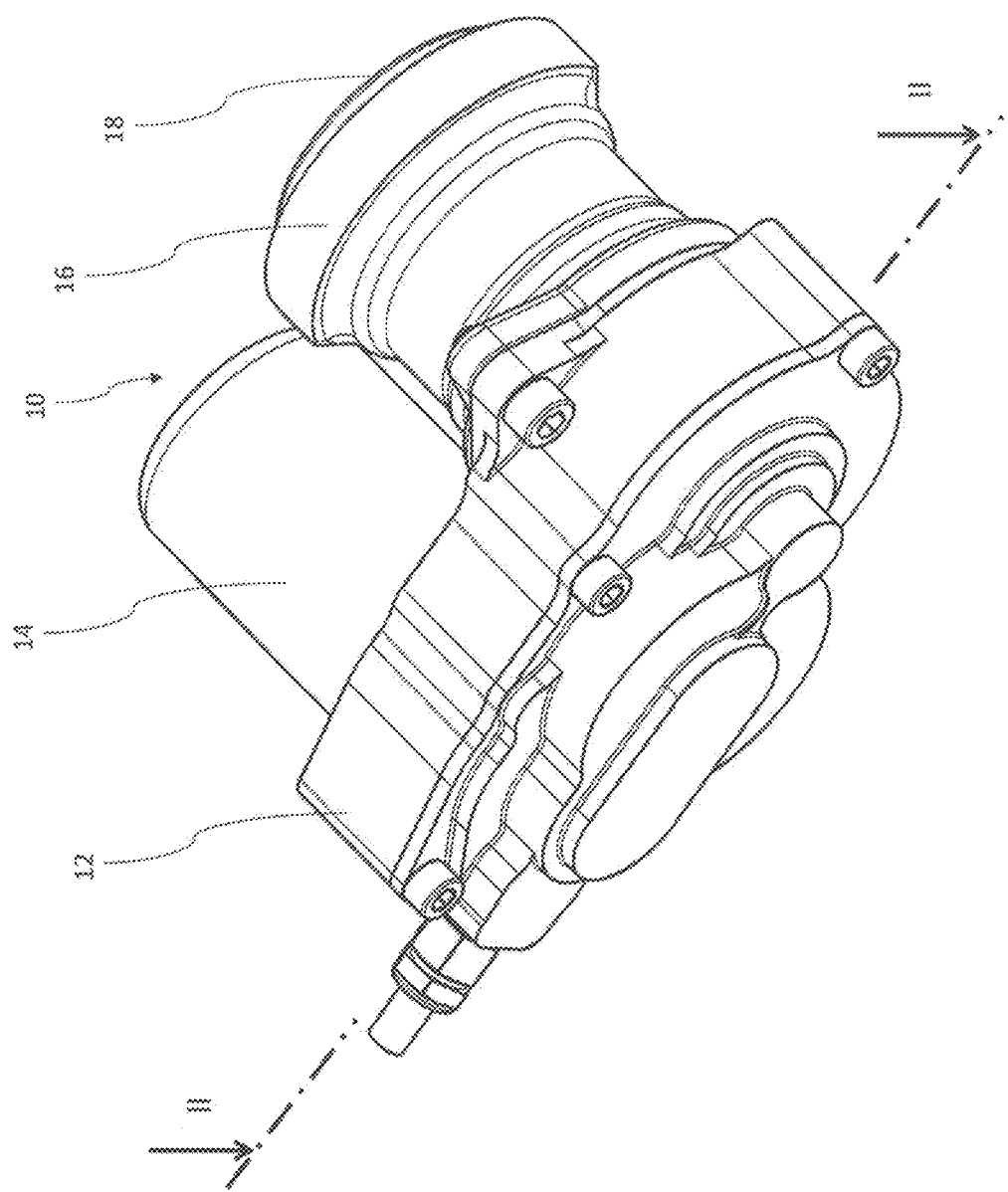
FIG. 1 shows a three-dimensional exterior view of an actuator assembly to illustrate the technical background of the motor vehicle brake according to the invention.

FIG. 1 shows an actuator assembly of a motor vehicle brake in a three-dimensional diagram, labeled with 10 in general. FIGS. 1 through 5 serve to illustrate the technical background of the invention. The actual exemplary embodiments are described with reference to FIGS. 6 through 9.

FIG. 1 shows a housing 12, in which a gear train is situated as well as a partial housing 14 for accommodating a drive motor and another partial housing 16, in which a displaceable piston 18 is arranged, with which a brake lining (not shown) can be displaced in an active braking manner in a brake unit of a motor vehicle brake. The actuator assembly 10 shown in FIG. 1 of the motor vehicle brake according to the invention can be installed in a sliding caliper brake, for example, in the usual way. Reference is made in this regard to the document WO 2009/046899 A1 which discloses such an installation situation as an example. This document is a patent application by the present patent applicant. The following discussion relates to the actuator assembly consisting of a motor drive and a displacement mechanism for displacement of the brake lining, the following description is concentrated on these components. Only corresponding components are also shown in the figures.

Figure 2:
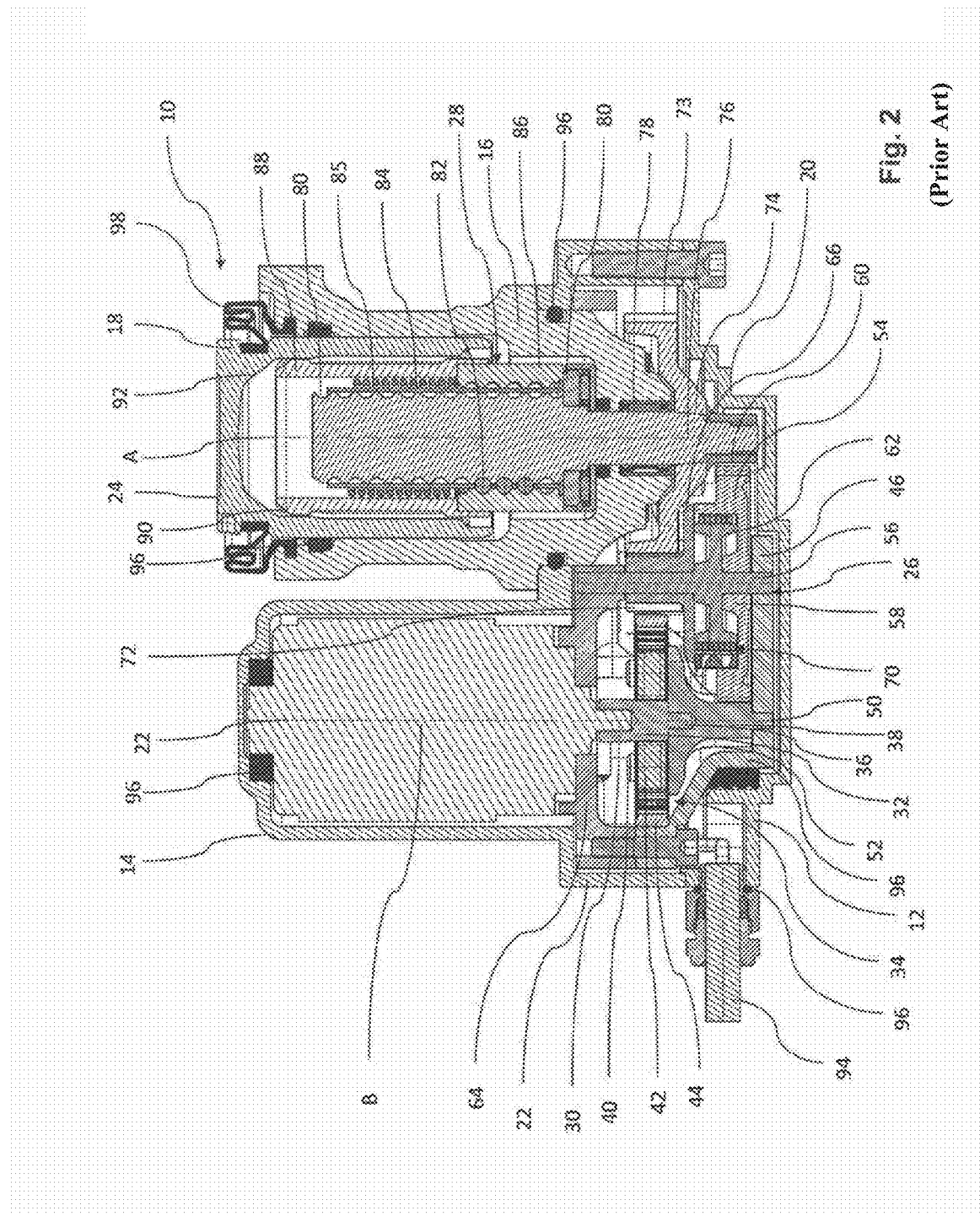
FIG. 2 shows a sectional view through an actuator assembly of a motor vehicle brake according to FIG. 1.

FIG. 2 shows a cross-sectional view through the drive unit 10 shown in FIG. 1, the view including an axle. It can be seen here that the housing 12 is designed in multiple parts and consists of a housing cover 20, the partial housing 14 for receiving an electric motor 22 and the partial housing 16 for displaceable accommodation of the piston 18. The piston 18 is hydraulically and electromechanically displaceable along the longitudinal axis A in an essentially known manner. Its exposed surface 24 cooperates in the usual way with a brake lining arrangement (not shown) to achieve a braking effect. A hydraulic displacement takes place in the known way during operational braking. An electromechanical displacement takes place by activating and releasing the parking brake function.

The following discussion goes into detail about the electromechanical displacement mechanism.

The displacement mechanism comprises a gear train 26 and a spindle-nut assembly 28. The two basic components of the displacement mechanism are shown in a cutaway view in FIG. 3 together with the electric motor 22. The gear train 26 serves to convert a rotational movement of the electric motor 22 into a corresponding linear movement of the piston 18 along the longitudinal axis A. In detail the electric motor 22 has a motor output shaft 30 extending along the longitudinal axis B of the motor. This output shaft is coupled to a gear wheel 32 in a rotationally fixed manner. The gear wheel 32 serves as a sun wheel of a planetary gear 34. The gear wheel 32 has a bearing journal 36 in its end but is remote from the motor. A planetary carrier 38 is mounted rotatably on this bearing journal 36 and in turn has a plurality of bearing journals 40. The bearing journals 40 serve to support planetary wheels 42, which are in meshing engagement with the gear wheel 32.

A hollow wheel 44 is arranged fixedly on the housing on the outside of the planetary wheels 42 radially. Another housing part 46 serves this purpose. The planetary carrier 38 is rotatably mounted in this housing part 46 with a bearing journal 50. It has external gearing 52 between the bearing journal 40 and its bearing journal 50. This external gearing 52 meshes with a first gear wheel 54 which is rotatably mounted on a stator 56, fixedly mounted on the housing itself, via a bearing section 58 on the inside radially and has external gearing 60 on its outside periphery. The gear wheel 54 is designed in the shape of a pot. In its interior a friction wheel portion 62 which is integrally molded on the stator 56 and therefore is also mounted in the housing 12 in a rotationally fixed manner, in particular being mounted on the housing part 46 and on another housing part 64 in a rotationally fixed manner, for example pressing of this portion extends in the interior of the gear wheel. A second gear wheel 66 is rotatably mounted on the stator 56. This second gear wheel 66 with this type of brake may be coupled to the first gear wheel 54 via a wrap spring clutch 70 for transfer of the torque. This will be discussed in detail below. The second gear wheel 66 has external gearing 72 on its portion facing away from the first gear wheel 54. This gearing meshes with external gearing 73 on an output gear wheel 74 which is supported in a rotationally fixed manner on a spindle 76 of the nut-spindle assembly 28.

It can be seen in FIG. 2 that the spindle 76 is mounted via a radial needle bearing 78 and an axial bearing in the housing part 16. The spindle 76 has on its outer periphery a threaded formation 80 that holds roller bodies 82. The roller bodies 82 are held in a rolling body cage 84 extending over a helical spring 85 into its initial position, shown in FIGS. 2 and 3. A nut 86, which executes a linear movement inside the housing part 16 with a rotational movement of the spindle 76 in the usual way, is supported on the rolling bodies 82. The nut 86 is fixedly connected to a clutch element 88, which is also displaced accordingly in the movement of the nut 86. The clutch element 88 has a conical clutch surface 90 on its free end. This clutch surface, which can be brought into engagement with a corresponding piston surface 92 in the interior of piston 18 and with the piston 18, can be shifted for displacement of same and thus for displacement of the brake lining (not shown).

Furthermore, connecting cable 94 as well as various gaskets 96 can be seen in FIG. 2 for sealing and/or guiding with a seal the components connecting parts to one another and to the cable. Finally, it remains to be seen that the piston 18 is sealed with a bellows 98.

Figure 3:
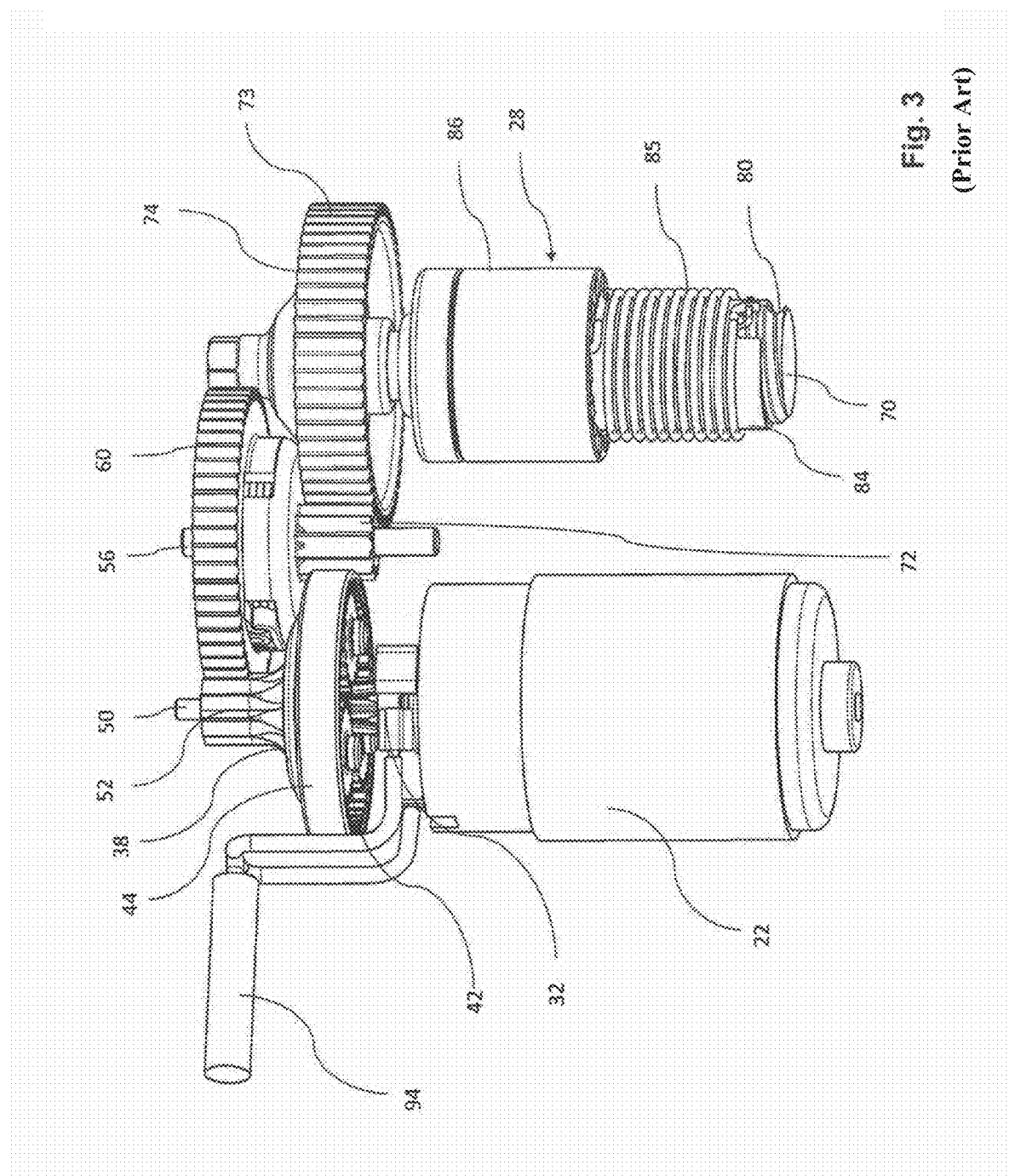
FIG. 3 shows a view of the electric motor, the gear train and the spindle.

Details of the displacement mechanism can be seen in FIGS. 2 and 3.

Figure 4:
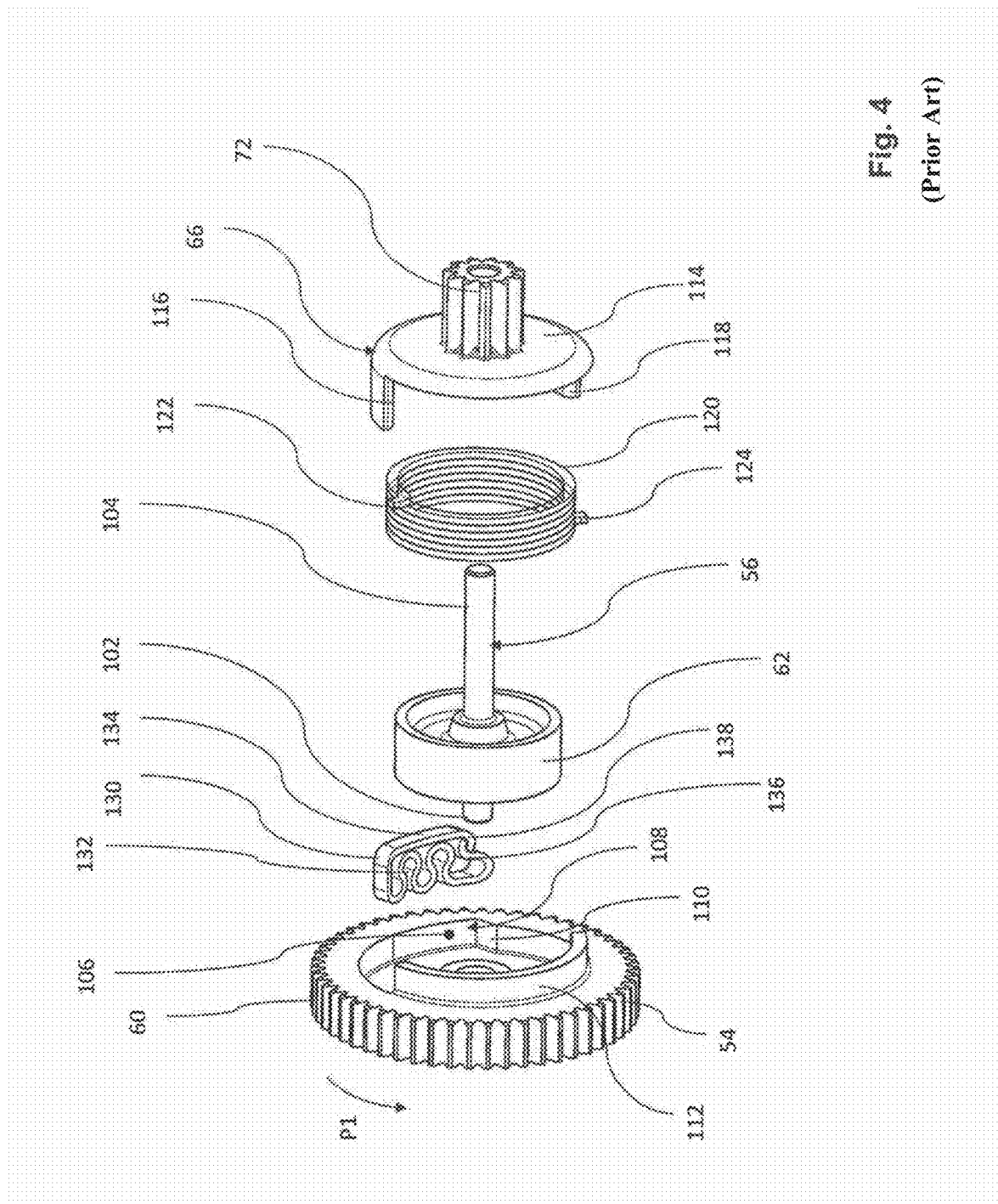
FIG. 4 shows an exploded view to illustrate the wrap spring clutch.
Figure 5:
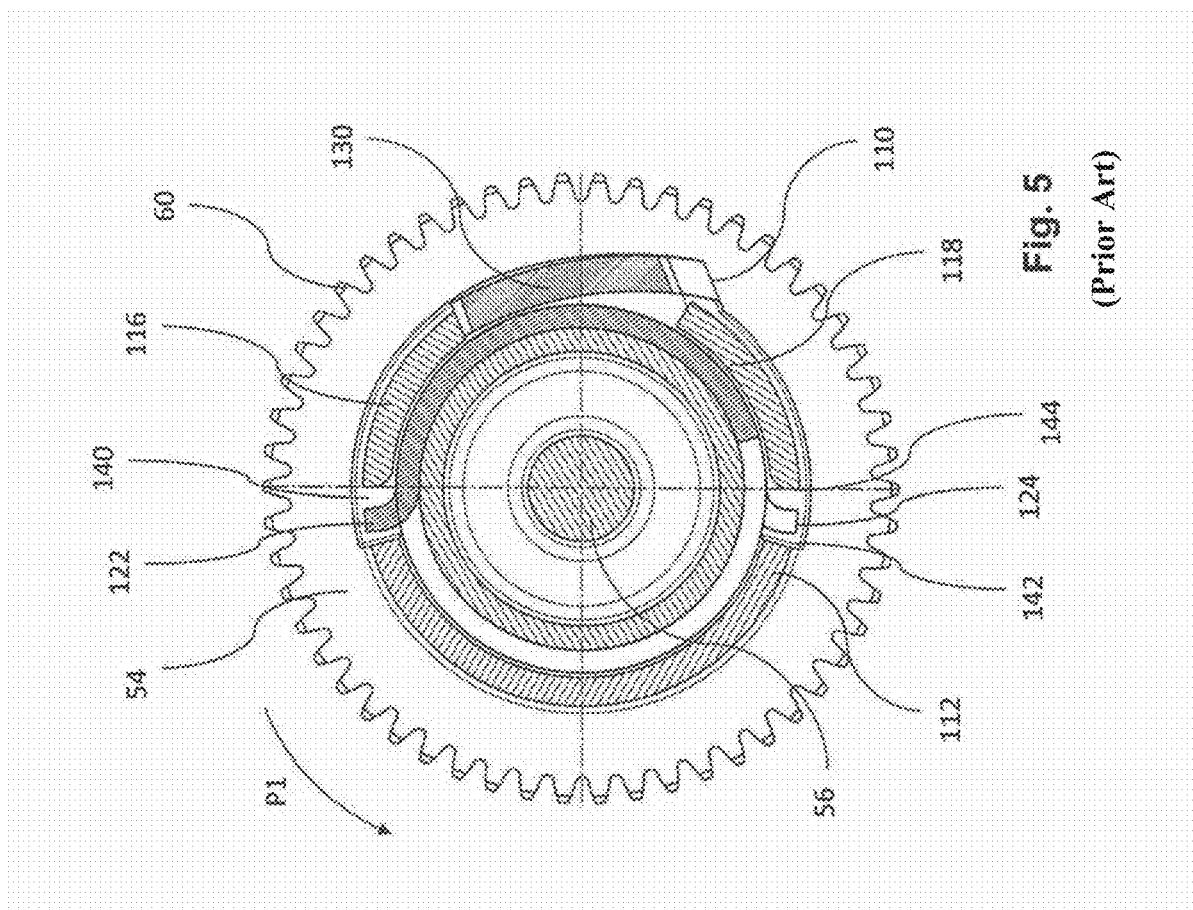
FIG. 5 shows an axially orthogonal sectional view of the arrangement of two gear wheels with a wrap spring clutch.

To now turn to FIGS. 4 and 5, the structure and the individual components of the wrap spring clutch 70 can be seen there. In the interior of the wrap spring clutch 70, the stator 56 is provided with its friction wheel portion 62. As already explained, the stator 56 is fixedly mounted on the housing and therefore is mounted by means of two bearing journals 102, 104 in the housing, so that it cannot be rotated. At first, gear wheel 54 is mounted on the stator 56 and has on its outside circumference the exterior gearing 60 and in its interior is provided with a cavity 106. The cavity 106 is provided with a pocket 108 on the side with a contact surface 110. Furthermore, a pawl 112 in the form of a segment of a circle extends outward from a lateral surface of the first gear wheel 54.

The second gear wheel 66 has, in addition to its external gearing 72, a plate-type structure 114, on which a first pawl 116 and a second pawl 118 are arranged, extending in the axial direction. Furthermore, a helical spring 120 having cropped ends 122 and 124 can be seen in FIG. 4. The helical spring 120 is of such dimensions that it is in tight contact with the outside peripheral surface of the friction wheel portion 62 in the relaxed state but can still slide on it. For assembly, the helical spring 120 is placed on the friction wheel portion 62. This arrangement is accommodated in the cavity 106. The two cropped ends 122 and 124 extend so far outward in the radial direction that they can be brought into engagement with the pawls 112, 116, 118, as will be examined in detail below, without sliding along or scratching the surfaces adjacent to the cavity 106.

Furthermore, FIG. 4 also shows a molded spring 130 having a plurality of coiled loops 132 extending along a base line 134. The two ends 136, 138 engage in one another. The coiled loops 132 can be compressed from their relaxed position into a compressed position under the influence of a force F. The molded spring 130 is arranged in the pocket 108 and its last wrap is in contact with the contact surface 110.

The assembled state of the wrap spring clutch 70 can be seen in FIG. 5, where it should also be pointed out that the cropped spring end 122 is accommodated between the pawl 116 and the pawl 118 in the intermediate space 140.

In general the motor vehicle brake described above with its actuator assembly described above is used primarily for activation of a parking brake function. This means that in the case of operation of the brake, the piston 18 is usually displaced hydraulically in such a way that it is displaced out of the housing parts 16. Likewise it must be possible for the piston 18 to be partially or entirely displaced back into its starting position according to FIG. 2 on release of the motor 22 for release of the brake in the case of operation of the brake. This is usually accomplished solely by the effect of relaxation on the brake lining (not shown) and with the mediation of the restoring spring 85 without requiring a motor drive by electric motor 42. It should be pointed out that, for the case of operation of the brake, relatively low tension forces are required.

In a parking brake situation, the piston 18 is displaced with a relatively great tension force to create a parking brake effect and it should be held in this position consistently in order to park the vehicle reliably. The piston position must absolutely be maintained in order to retain the effect of the parking brake and the piston 18 should be prevented from displacement in reverse over a period of time due to settling processes in the gear train 26. Only when active control takes place by means of the motor 22, thereby actively releasing the parking brake, can the piston 18 be displaced back into its starting position according to FIG. 2.

A distinction must thus be made between the operating brake situations and the parking brake situation, wherein a transfer of force from the piston 16 to the motor 22 is to be allowed or suppressed, depending on the prevailing status of the brake. To do justice to this requirement, the wrap spring clutch 70 is used in the manner shown here. The wrap spring clutch 70 functions as follows in interaction with the two gear wheels 54 and 66:

First, the transfer of force from the gear wheel 54 to the motor side shall be considered, i.e., the case in which the motor 22 is driven and the gear wheel 54 is rotationally driven with the planetary gear 34 in between as a mediator. There are two directions of rotation here, namely the direction of rotation of the gear wheel 54 in the counterclockwise direction for applying tension to the brake (applying tension to the operating brake and the parking brake) and the direction of rotation of the gear wheel 54 in the clockwise direction for active release of the brake (release of the parking brake).

In rotation of the first gear wheel 54 counterclockwise according to arrow P1—this corresponds to a movement for displacement of the piston 18 out of the housing 16, i.e., for activation of the brake via the motor 22 in an operating brake situation and in a parking brake situation—the molded spring 130 is shifted over the contact face 110 toward the pawl 116. The greater the resistance presented by the pawl 116 against such a shifting (i.e., with an increase in the tension forces), the greater is the compression of the molded spring 130. The helical spring 120 remains ineffective during this actuation counterclockwise according to arrow P1 because its spring ends can move freely in the clearance between the pawls 112, 116 and 118 and its slides on the friction wheel portion 62.

The molded spring 130 is compressed to a greater extent when greater tension forces occur, as is the case in activation of the parking brake, when the brake linings must be pressed strongly against the brake disc in activation of the parking brake. When the molded spring 130 is compressed to a greater extent as a result of a rotational according to arrow P1, this means that now the first gear wheel 54 has been displaced relative to the second gear wheel 56, depending on the compression of the molded spring 130. The maximum relative displacement is determined by the fact that the pawl 112 with its end face 142 comes into contact with the pawl 118 and its front end 144, with the cropped end 124 mediating in between. When this state is reached, the molded spring 130 is compressed to the maximum extent and any further rotation of the electric motor 22 by means of the gear train 26 is transmitted to the spindle nut assembly 28 for further application of tension by the parking brake.

Once the parking brake has been put under tension, reactive forces resulting from the tension force then act back on the gear train. These reactive forces, which are transmitted via the spindle nut assembly 28, the output gear wheel 74 and the external gearing 72, the pawls 116, 118, attempt to force the pawls back into their starting position, i.e., move them counterclockwise. However, as soon as the pawl 116 attempts to move back to its starting position, i.e., counterclockwise, it engages with the cropped end 122 of the helical spring 120. As a result of this mutual engagement, the helical spring 120 is tightened around the friction wheel portion 62 with the movement tendency of the pawl 116 in the counterclockwise direction, so that their wraps become constricted and act more strongly on the outside circumference of the friction wheel portion 62. This wrapping of the exterior peripheral surface of the friction wheel portion 62 results in the fact that the helical spring 120 can no longer slide on this exterior peripheral surface but instead becomes locked on it so to speak. Consequently, the pawl 116 cannot be moved back into its starting position. The parking brake remains activated so this rules out a settling operation.

A control of the motor 22 is necessary for releasing the parking brake again. This takes place in such a way that the gear wheel 54 is rotated clockwise. If the gear wheel 54 moves clockwise according to arrow P2—this corresponds to a movement for displacement of piston 18 into the housing 16, i.e., for active release of the brake via the motor in deactivation of the parking brake—then the pawl 112 also moves clockwise accordingly and releases the tension on the molded spring 130. In addition the helical spring 120 is released and releases the pawl 118 which can move back—following the pawl 112—which takes place under the influence of the restoring spring 85.

The wrap spring clutch 70 thus has the general effect that it ensures the parking brake function; that there is a transfer of torque from the motor to the spindle nut assembly even at high tension forces, and that settling effects are unintended release of the parking brake are prevented by the effect of the wrap spring clutch 70 in particular by the effect of the helical spring 120 which is then tightening and acting in a fixed manner on the outer peripheral surface of the friction wheel portion 62.

If the only thing to be implemented is a parking brake function, wherein the activation in the case of an operating brake is purely hydraulic, then the molded spring 130 is just an option and can be omitted.

If an operating brake function and a parking brake function are both to be provided with the brake with electromechanical activation, but the molded spring 130, which undergoes deformation to varying extents, depending on the prevailing stress state, is also to be used in addition. At low tension forces, such as those which usually occur during operational braking, the molded spring 130 is not deformed at all or is deformed only to a minor extent, so that it holds the helical spring 120 (wrap spring) inactively so to speak. A self-locking effect in the gear for the operating brake function can therefore be suppressed. Then a transfer of force through the gear in both directions between the motor drive and the spindle-nut assembly are possible. Only when the molded spring 130 is sufficiently compressed is the helical spring 120 (wrap spring) active in its function, so to speak, and locking a transfer of force through the gear from the spindle nut assembly to the electric motor. The molded spring 130 is thus necessary in the exemplary embodiment shown here because both brake functions—operating brake function and parking brake function—should be provided.

Based on this understanding of the embodiment according to FIGS. 1 through 5, the invention begins with optimization of this embodiment with regard to a favorable derivation of the reactive forces in the case of a self-locking effect. FIGS. 6 through 9 are therefore discussed below.

Figure 6:
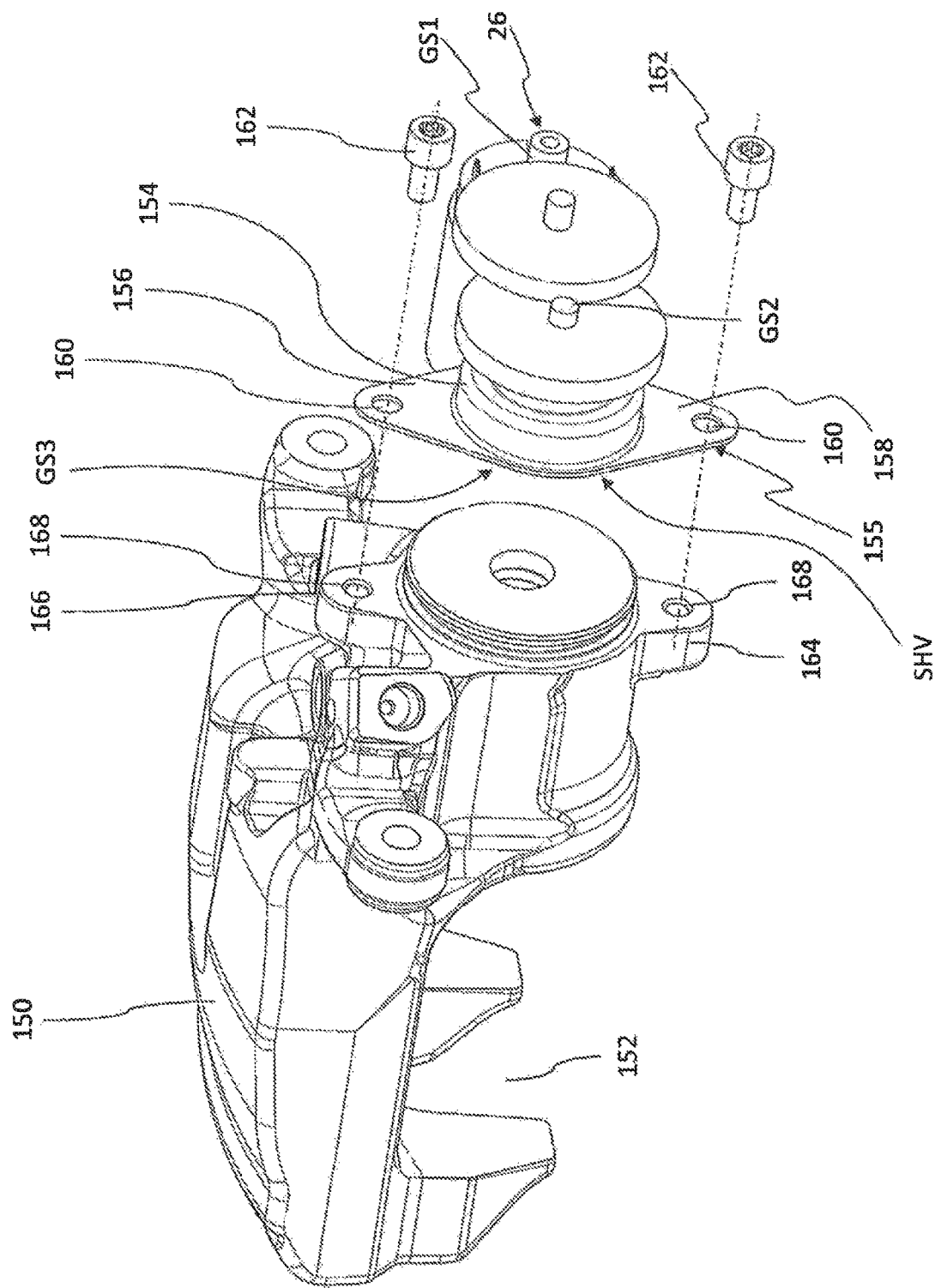
FIG. 6 shows an exploded view to illustrate the mounting of the wrap spring clutch by means of a pot-shaped force conducting element.

FIG. 6 shows the brake housing 150, which is designed like calipers in the usual way and has a recessed region 152, in which brake linings (not shown) are accommodated, and in which a brake disc (not shown) is guided in a known way. Furthermore, FIG. 6 shows schematically the motor drive 22 and the gear train 26 with its individual gear stages GS1 to GS3, wherein the gear stages GS1 and GS2 are designed as spur gear having meshing gear teeth, and wherein the gear stage GS3 is concealed. The self-locking device SHV, which is downstream from the gear stage GS2, is designed in the manner described above, i.e., with a wrap spring 120, for example.

The self-locking device SHV is accommodated in a pot-shaped housing part 154, which has a flange 155 with two lateral brackets 156, 158, together with the gear stage GS3. Openings 160, capable of accommodating the mounting bolts 162, are provided in the two brackets 156, 158. The pot-shaped housing part 154 can be mounted on corresponding mounting sections 164, 166 using corresponding threaded boreholes 168 by means of these mounting bolts 162. This means that the self-locking device SHV can be accommodated in the pot-shaped housing part 154 and can be mounted fixedly on the housing 150. The housing part 154 may thus be used as a force conducting element and can reliably divert the reactive forces occurring in the self-locking device SHV directly into the brake housing 150. In the installed state, it is fixedly mounted on the housing.

The housing part 154 which is used as the force conducting element is preferably manufactured from a steel plate as a deep-drawn part. The sectional view according to FIG. 7, which contains the axle, shows the housing part 154 with the wrap spring 120, which is accommodated therein and functions essentially in the same manner as described above. However, one important difference in comparison with the embodiment according to FIGS. 1 through 5 described above is that the first gear stage GS1 is not designed as a planetary gear, but instead the third gear stage GS3, which is connected directly upstream from the vehicle brake, is designed as the planetary gear and is integrated into the housing part 154. The hollow wheel of the planetary gear is shaped directly in the housing part 154. The internal teeth 169 can be seen here. The wrap spring 120 is arranged above the planetary gear in the housing part 154. The planetary carrier 172 is coupled to the spindle 76 (FIG. 2) of the vehicle brake in a rotationally fixed manner (not shown in detail here). The planetary wheels which mesh with the hollow wheel 154, 169 are mounted on the planetary carrier 172. A sun wheel 176, which at the same time has a bell shape in the area in which it offers a target face 178 for the wrap spring 120, is mounted in the planetary carrier 172 so that it can rotate and is coupled to the shaft 170 in a rotationally fixed manner. The shaft 170 extends out of the housing part 154. The planetary gear forms the gear stage GS3. Then the individual gear stages GS1 and GS2 which are designed with front teeth are connected upstream from the shaft 170. This arrangement may also be accommodated in a housing 180 which is made of plastic and is therefore lightweight.

Figure 8:
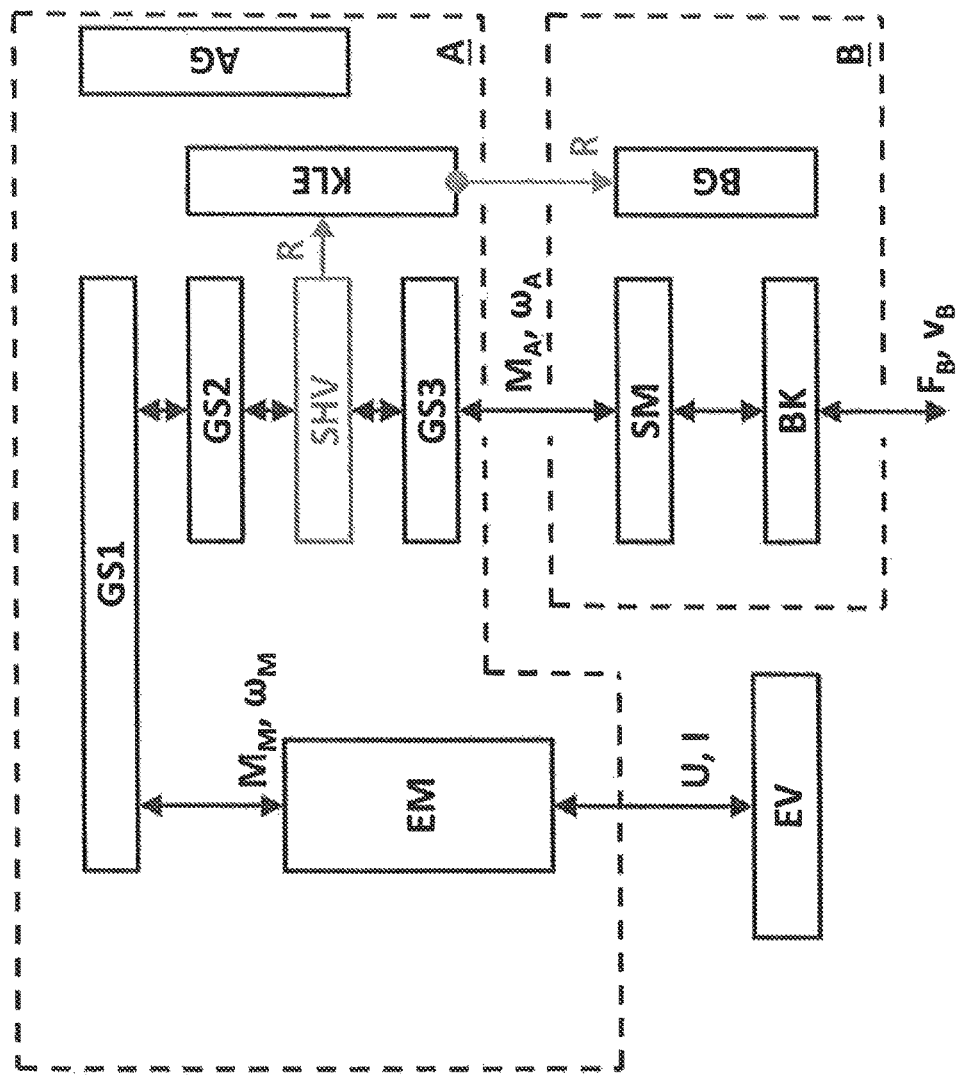
FIG. 8 shows a schematic view of one embodiment to illustrate the effect of the force conducting element.

FIG. 8 illustrates the arrangement in a schematic diagram, showing that the electric motor EM, which is driven by an electric power source EV, delivers a motor torque MM via an output shaft and delivers it at an angular velocity $\omega_M$ of the motor to a first gear stage GS1 of the gear train. The gear train having the individual gear stages GS1 to GS3 and the electric motor EM is disposed in the housing section AG. This housing section may also be referred to as the actuator housing section AG. The self-locking device SHV, in which the reactive forces R occur, is arranged between the second gear stage GS2 and the third gear stage GS3.

Starting from the third gear stage GS3, a torque $M_A$ is transferred to the brake B at an actuator angular velocity $\omega_A$. The brake includes a spindle-nut arrangement SM of a ball screw drive and a brake plunger BK, starting from which the brake actuating force $F_B$ is transferred to the brake linings with an actuating speed $v_B$. From this brake plunger BK, reactive forces act back in the event of braking.

Figure 7:
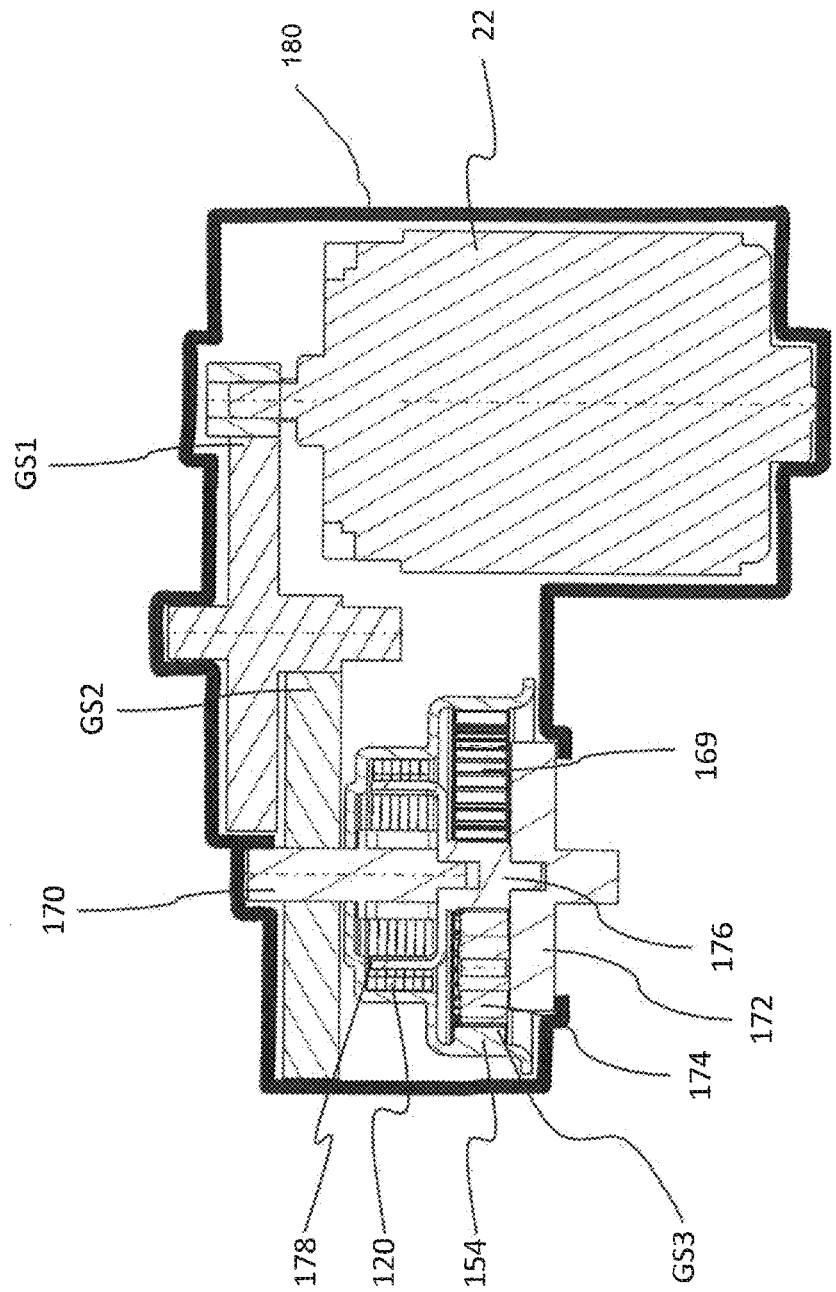
FIG. 7 shows a sectional view to illustrate the force conducting element inside the gear train.

The special feature of this embodiment is that the self-locking device SHV is connected downstream from the second gear stage GS2 and is coupled directly to the first conducting element KLE namely in the manner illustrated in FIGS. 6 and 7. The self-locking device SHV and the third gear stage GS3 are integrated into the force conducting element KLE. Therefore the reactive forces R can be absorbed directly by the self-locking device SHV and introduced into the housing BG (150 in FIG. 6) which is designed to be solid through an appropriate mount. This is done in a practical embodiment by flange mounting on the housing sections 164, 166 by means of the brackets 156, 158 and the mounting bolts 162. The gear stages GS1 and GS2 in this embodiment can be enclosed in a relatively weak and lightweight housing AG (180 in FIG. 7), which is made of a plastic material in particular so that it is possible to reduce the weight. Furthermore this arrangement has the advantage that the reduction [of the gear ratio] of the gear stage GS3 can also be utilized to reduce the reactive forces.

Figure 9:
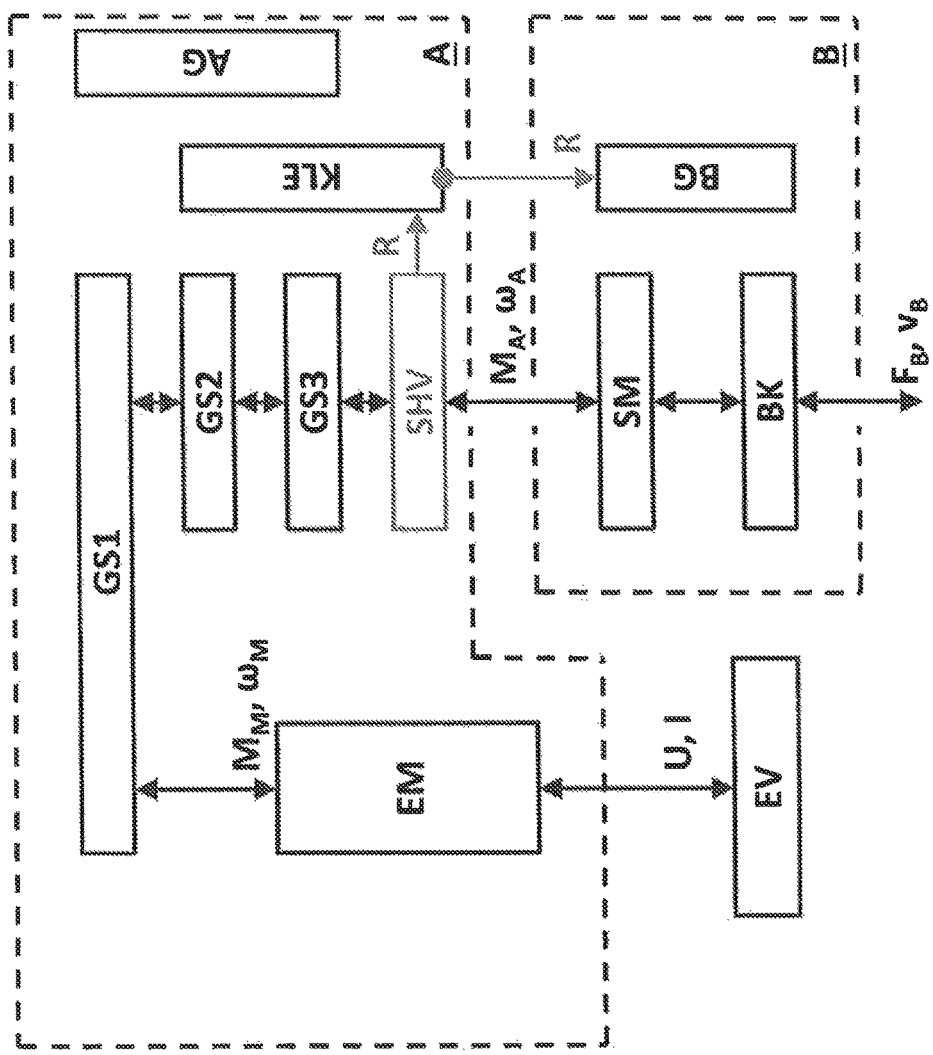
FIG. 9 shows a schematic view of an alternative embodiment to illustrate the effect of the force conducting element.

FIG. 9 shows another embodiment of the invention in which it can be seen that the self-locking device SHV is arranged between the third gear stage GS3 and the brake B. Again in this embodiment the force conducting element KLE is used to transfer the reactive forces occurring in the self-locking device SHV directly to the housing BG of the vehicle brake. In practice this may be accomplished for example by designing the pot-shaped housing part 154 to be somewhat smaller in comparison with the diagram in FIG. 7 and for this housing part to accommodate only the self-locking device SHV. The gear train can thus be designed in the way illustrated in FIG. 2 where the self-locking device is connected directly upstream from the brake.

The advantages of the invention thus lie in the arrangement of the self-locking devices SHV in the force-inducting element KLE in order to introduce the reactive forces occurring in the self-locking device SHV directly into the brake housing BG and/or 150.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A combined hydraulically and electromechanically operable motor vehicle brake having an actuator subassembly comprising:
   a brake housing,
   an actuation member which is movable in relation to the brake housing for hydraulically or electromechanically moving a brake lining,
   a motor drive,
   a displacement mechanism arranged between the motor drive and the movable actuation member,
   a gear arrangement assigned to the displacement mechanism, and
   a separate self-locking device, which is configured to block the displacement mechanism as needed,
   wherein the gear train has at least two gear stages, wherein the self-locking device is arranged in or on the gear train in such a way that reactive forces occurring as part of the self-locking effect of the self-locking device are configured to be diverted into the brake housing by means of a force-conducting element, and
   wherein the force conducting element is configured as a receptacle body, in which the self-locking device is accommodated at least in part, the receptacle body being coupled to the brake housing in a force-transmitting manner,
   wherein the self-locking device is configured with a wrap spring clutch, which allows a transfer of torque from the motor drive to a spindle and is configured for blocking the transfer of torque from the spindle to the motor drive,
   the receptacle body is configured as a hollow body and has at least one mounting flange, by means of which the receptacle body is coupled to the brake housing in a force-transmitting manner,
   and the self-locking device is connected upstream from the gear stage of the gear train closest to the movable actuation member and is accommodated together with this gear stage in the receptacle body, and the wrap spring clutch is integrated into the receptacle body, wherein the gear stage accommodated in the receptacle body is a planetary gear, wherein the receptacle body is configured as a hollow wheel of the planetary gear.

2. The motor vehicle brake according to claim 1, wherein the receptacle body is manufactured as deep-drawn part from a steel material.

3. The motor vehicle brake according to claim 1, wherein the receptacle body has at least two lateral mounting brackets with mounting boreholes.

4. The motor vehicle brake according to claim 1, wherein the displacement mechanism has a ball screw drive with a spindle and a nut, wherein one component of the spindle and the nut is configured to be optionally driven to rotation, and another component of the spindle and the nut is configured to be displaced linearly for displacement of the actuation member by rotational drives of the one component of the spindle and the nut inside the housing.

5. The motor vehicle brake according to claim 1, wherein the gear train has three or four gear stages, wherein the self-locking device is arranged close to the movable actuation member inside the gear train.

6. The motor vehicle brake according to claim 5, wherein a first gear stage and a second gear stage, each as spur gears, have a reduction ratio from the range between 4.4:1 and 6.6:1.

7. The motor vehicle brake according to claim 6, wherein a third gear stage is configured as the planetary gear, which has a reduction ratio from the range between 6.4:1 and 8.6:1.

8. The motor vehicle brake according to claim 5, characterized in that the actuator subassembly has a total reduction ratio from the range between 115:1 and 400:1.

9. The motor vehicle brake according to claim 1, wherein a switch element, which is assigned to the wrap spring clutch, allows, in a first switch position, a transfer of torque from the spindle to the motor drive, and on reaching a second switch position, triggers the wrap spring clutch to block a transfer of torque from the spindle to the motor drive.

10. The motor vehicle brake according to claim 6, wherein the reduction ratio is approximately 5.4:1.

11. The motor vehicle brake according to claim 7, wherein the planetary gear reduction ratio is approximately 7.125:1.

12. The motor vehicle brake according to claim 8, wherein the actuator subassembly total reduction ratio is approximately 208:1.

* * * * *